United States Patent [19]

Mattox

[11] 4,270,786
[45] Jun. 2, 1981

[54] DUMPING WHEELBARROW

[76] Inventor: McKinley Mattox, 4910 Gratian, Los Angeles, Calif. 90022

[21] Appl. No.: 63,189

[22] Filed: Aug. 3, 1979

Related U.S. Application Data

[63] Continuation-in-part of Ser. No. 923,559, Jul. 11, 1978.

[51] Int. Cl.³ .............................................. B62B 1/24
[52] U.S. Cl. ........................................ 298/3; 298/10; 298/22 R; 280/47.32
[58] Field of Search ...................... 298/2, 3, 10, 22 R; 280/47.32

[56] References Cited

U.S. PATENT DOCUMENTS

| | | | |
|---|---|---|---|
| 1,516,856 | 11/1924 | Johnson | 298/2 X |
| 2,544,505 | 3/1951 | Kronhaus | 298/3 X |
| 2,601,163 | 6/1952 | Miller | 298/22 R |
| 2,852,304 | 9/1958 | Harrison | 298/3 |
| 3,092,418 | 6/1963 | Themascus | 298/3 |
| 3,323,837 | 6/1967 | Landry | 298/2 |
| 3,348,714 | 10/1967 | Ash | 298/10 |

Primary Examiner—Leslie J. Paperner
Assistant Examiner—Terrance L. Siemens
Attorney, Agent, or Firm—Edgar W. Averill, Jr.

[57] ABSTRACT

A dumping wheelbarrow capable of providing a forward tilt to the barrow while maintaining the legs of the wheelbarrow on the ground. The wheelbarrow has a frame which supports the barrow which frame has a wheel and a pair of legs together with a pair of extending handles. The barrow is pivoted at a forward barrow point and is caused to dump by the action of a hydraulic piston affixed at one end to the frame and at the other end to the bottom of the barrow.

4 Claims, 2 Drawing Figures

DUMPING WHEELBARROW

CROSS REFERENCE TO RELATED APPLICATIONS

This application is a continuation-in-part of applicant's co-pending application, Ser. No. 923,559 filed July 11, 1978.

BACKGROUND OF THE DISCLOSURE

The field of the invention is wheelbarrows and the invention more specifically relates to wheelbarrows of the type which can be caused to dump while the wheel and legs of the wheelbarrow are maintained on the ground.

Various means have been known for emptying the contents of wheelbarrows and although the standard wheelbarrow is not equipped with any separate dumping ability, several wheelbarrows have been designed and used which have this capability. Among such wheelbarrows are those shown in the U.S. Pat. Nos. 3,092,418; 2,973,224; 2,852,304; 2,554,505; 2,037,222; 1,063,112 and 726,931. Such past attempts have not been successful for a variety of reasons.

The ability of a wheelbarrow to dump while the legs are maintained on the ground provides a very important advantage to the user particularly for heavy duty use. In spite of modern technology such as concrete pumps, wheelbarrows are still widely used in construction. It is often not practical to convey the concrete or other load to the needed area by a trough or by a concrete pump.

It is possible to carry between 200 to 300 pounds of concrete in a typical commercial wheelbarrow. While a workman can readily roll a wheelbarrow with this weight of contents, when it becomes necessary to dump the wheelbarrow, it is difficult to raise the handles to a height sufficient to cause the dumping. This raising particularly when often repeated can lead to back injuries, muscle strain and the like. With the discomfort to the worker and the ever increased cost of health care, every effort should be taken to reduce such injuries, and it is for this purpose that the present invention is designed.

Another problem is the shifting of some loads such as wet concrete during dumping which can result in spilling. Another disadvantage of most conventional wheelbarrows is that it is not possible or practical to watch the dumping of the contents from the position behind the barrow handles because the barrow itself is necessarily between the line of vision and the point at which the barrow contents are being dumped. While the above discussion emphasizes the use of the wheelbarrow of the present invention with wet concrete, other loads are, of course, contemplated.

SUMMARY OF THE INVENTION

The present invention is for a dumping wheelbarrow capable of providing a forward tilt to the barrow while maintaining the legs of the wheelbarrow on the ground. The wheelbarrow has a frame member having first and second arms terminating in a pair of handles integral therewith. A wheel is rotatingly held to the frame in a conventional manner at the opposite end of the frame from the handles. The barrow is affixed at a forward barrow point to the frame. The barrow has a sloping front side, a bottom side surface and back side, and the barrow pivot is located near the mid-point of its sloping front side. Hydraulic piston means are affixed at its lower end to the frame and at its upper end to the barrow near the longitudinal mid-point of the bottom surface nearer to the back side than to the front side thereof. Hydraulic pump means are affixed to the frame and have a hydraulic line connected to the hydraulic piston. Handle means are affixed to the pump means to operate a piston which forces hydraulic fluid through the lines causing the piston to extend thereby tilting the barrow upwardly.

DESCRIPTION OF THE PREFERRED EMBODIMENTS

Figure 1:
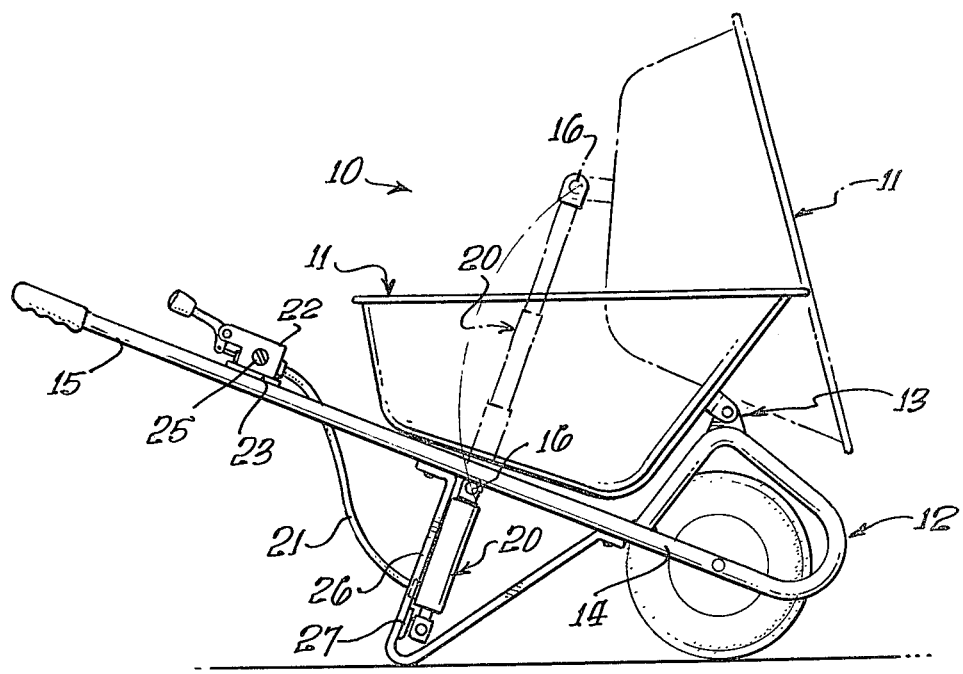
FIG. 1 is a side elevational view of the dumping wheelbarrow of the present invention showing the barrow in an up position in phantom lines.
Figure 2:
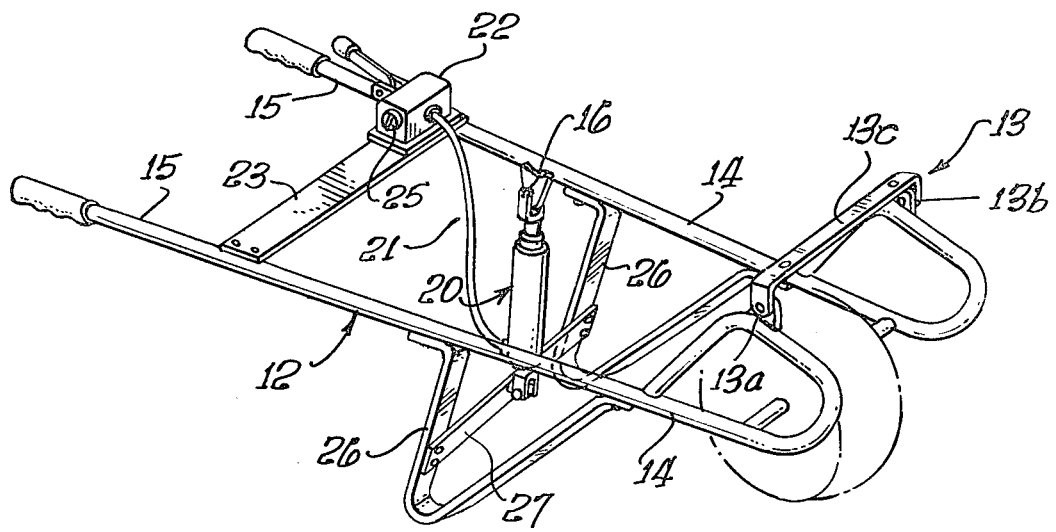
FIG. 2 is an enlarged perspective fragmentary view of a portion of the wheelbarrow of FIG. 1.

A wheelbarrow generally indicated by reference character 10 has a barrow or load-holding hopper 11 which is pivotally attached to a frame 12 at a forward barrow pivot 13. Frame 12 is curved around and welded for support to its lower member strut 14 which extends rearwardly and ends in a pair of integral handles 15. Barrow 11 is pivoted not only at forward barrow pivots 13a and 13b, but also at a rearward barrow pivot 16.

The pivoting of barrow 11 is accomplished by the extension of piston 20 which, in turn, is caused by the movement of hydraulic fluid through hydraulic line 21 which is affixed at its lower end to piston 20 and at its upper end to pump 22. Hydraulic pump 22 is affixed to the frame 12 of the wheelbarrow and more particularly is attached to a member 23 welded between the two portions of the strut 14 near the handles 15. Hydraulic pump 22 is relatively conventional and has a handle 24 which is pivotally attached to pump 22 and operates a hydraulic piston not shown. A valve handle 25 controls the flow of hydraulic fluid into or out of hydraulic line 21. When the valve to which valve handle 25 is attached is closed, movement of handle 24 will cause piston 20 to extend and to remain in an extending position. When valve handle 25 is turned counter clockwise, the hydraulic fluid is allowed to flow back into the resevoir of pump 22 and the piston 20 will retract. The operation of hydraulic pump 22, handle 24 and valve 25 is conventional and a more detailed discussion is not believed necessary for an understanding of the present invention.

Piston 20 is preferably of a telescoping design so that the barrow 11 may be tilted sufficiently so that the forward edge of barrow 11 can tilt downwardly to assure complete dumping even when the wheelbarrow legs (which are indicated by reference character 26) remain on the ground. Piston 20 is connected at its lower end to a member 27 which is bolted or welded to legs 26. Piston 20 is connected at its upper end to the rearward barrow pivot 16.

In operation, the wheelbarrow is filled from a cement mixer or other source of load and moved to the desired location for dumping. Valve handle 25 is then turned in a clockwise direction to close the valve and handle 24 is moved up and down to cause hydraulic fluid to enter piston 20. This causes piston 20 to extend and tilt the barrow to a position shown in phantom lines in FIG. 1. After the contents of the barrow have been emptied, valve handle 25 is turned in a counter-clockwise direction and piston 20 is caused to retract thereby lowering barrow 11 to the position shown in solid lines in FIG. 1.

The forward barrow pivot 13 comprises a pair of pivot points 13a and 13b which are braced by cross bar 13c. This provides stability for the barrow during the dumping operation. During the carrying operation, the barrow 11 rests on the frame strut 14 which extends to form the handles 15 of the wheelbarrow.

It is, of course, possible to locate the hydraulic pump 22 on either side of the wheelbarrow frame. It is also possible to attach the lower end of piston 20 to one or more frame members attached to strut 14 rather than to the legs 26. A telescoping piston, while not essential, is preferred because of its ability to retract to a length so it may readily be placed under the barrow 11. A three section telescoping piston is preferred.

Another advantage of the present invention is its ability to dump a part of the load, for instance to fill a first form and then lower the barrow and move it to a second location to dump a further amount. Because of the control available with the hydraulic pump and piston combined with the stability available with the legs of the wheelbarrow maintained on the ground, a very accurate amount may be dumped.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

I claim:

1. A dumping wheelbarrow capable of providing a forward tilt to the barrow while maintaining the legs of the wheelbarrow on the ground, said dumping wheelbarrow comprising:
    a frame member having first and second arms terminating in a pair of handles integral therewith;
    a wheel held to said frame at the opposite end of the frame from the handle;
    a barrow having a sloping front side, a bottom surface and back side, said barrow being pivotally attached at a forward barrow pivot to said frame near the mid point of its sloping front side, the pivot point of said barrow being adjacent said sloping front side near the mid point thereof;
    hydraulic piston means affixed at its lower end to said frame and its upper end to said barrow near the longitudinal central axis of the bottom surface nearer to the back than to the front side thereof;
    hydraulic pump means affixed to the frame and having hydraulic line means connected to said hydraulic piston; and
    handle means affixed to the pump means whereby the movement of said handle means causes hydraulic fluid to flow into said piston when it is in a retracted position causing said piston to extend thereby causing said barrow to pivot upwardly in a dumping action.

2. The wheelbarrow of claim 1 wherein said piston is attached to a member held by the legs of the wheelbarrow affixed to the frame thereof.

3. The wheelbarrow of claim 1 wherein said piston is a multi-stage telescoping piston.

4. The wheelbarrow of claim 3 wherein said telescoping piston has three stages.

* * * * *